A. M. E. STREIJFFERT.
SHEET RUBBER LINER.
APPLICATION FILED FEB. 24, 1919.

1,356,234. Patented Oct. 19, 1920.

Inventor:
August M. E. Streijffert
by his Attorneys.
Howson & Howson

UNITED STATES PATENT OFFICE.

AUGUST M. E. STREIJFFERT, OF NORRISTOWN, PENNSYLVANIA, ASSIGNOR TO DIAMOND STATE FIBRE COMPANY, OF BRIDGEPORT, PENNSYLVANIA, A CORPORATION OF DELAWARE.

SHEET-RUBBER LINER.

1,356,234. Specification of Letters Patent. Patented Oct. 19, 1920.

Application filed February 24, 1919. Serial No. 278,800.

*To all whom it may concern:*

Be it known that I, AUGUST M. E. STREIJFFERT, a subject of the King of Sweden, residing in Norristown, Pennsylvania, have invented Sheet-Rubber Liners, of which the following is a specification.

One object of this invention is to provide a novel means for protecting sheet rubber in roll, coil or laminated form from drying or oxidizing, as well as for preventing successive layers of such rubber from sticking together;—the invention more especially contemplating the provision of sheet rubber with a removable membraneous cover or layer of such nature that it is not only impervious to air, but while being capable of adhering to the rubber, is of such toughness and pliability as to permit of its being conveniently stripped or removed when the rubber is to be used.

Figure 1:
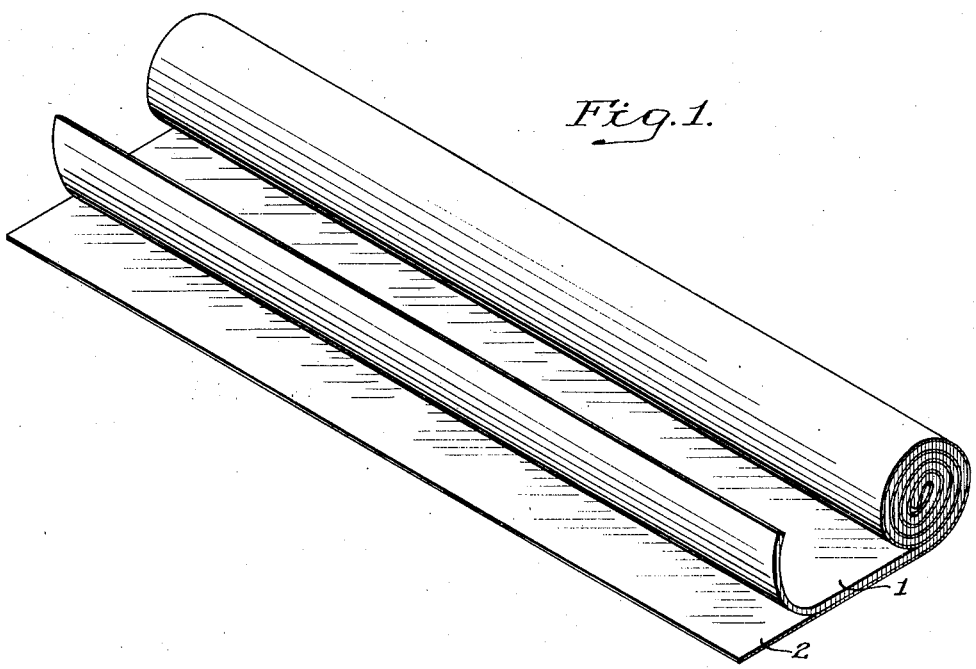
Figure 2:
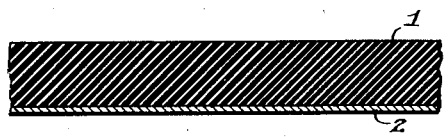

These objects and other advantageous ends I attain as hereinafter set forth, reference being had to the accompanying drawings, in which, Figure 1 is a perspective view of a roll of rubber, showing my invention as applied thereto; and Fig. 2 is a vertical section on an enlarged scale, further illustrating said invention.

It is customary for certain purposes to form thin sheet rubber in a coil or roll and it is necessary not only to prevent the successive layers of such a roll from sticking to each other, but also to provide means whereby while such layers are held apart, the air is kept from the rubber so as to prevent its drying or oxidizing.

In order to accomplish this object I apply to one face of the rubber sheet 1 prior to its formation into a roll and while its surface is more or less sticky, a relatively thin sheet of parchmentized vegetable fiber 2. Such sheet by virtue of its composition and method of manufacture, is impervious to air, and in order to toughen and make it soft and pliable, I treat or impregnate it with glycerin. Thereafter it is highly calendered and applied to one face of the rubber sheet to which it firmly adheres. Said sheet with its membraneous parchmentized cover is then rolled in a coil after which it may be kept without drying or oxidation.

When it is desired for use, it may be easily unrolled and the parchmentized sheet stripped from it,—this being possible in spite of the strong adhesion between said strip and the rubber because of the toughness and pliability of the former. It may be noted that not only is the membraneous covering effective in preventing access of the air to the rubber, but it is relatively inexpensive both as regards its first cost and the cost of its application to the rubber.

Without departing from my invention, the membraneous parchmentized sheet or body of strip material may be applied to successive layers or sheets of rubber when these are to be stored or transported in flat form rather than in a coil as above described.

After the parchmentized fiber sheet has been applied to one face of the other rubber sheet, it will thereafter adhere to this face more strongly than to the opposite face of this or any other sheet which may be superposed upon it, so that while successive rubber sheets with their parchmentized fiber covering may be readily separated, it is more difficult to strip said fiber sheet from that face of a rubber sheet to which it was originally applied. This operation may however be quickly and easily performed without tearing of the parchmentized sheet owing to its toughness and pliability.

I claim:

1. The combination of a sheet of rubber with a separable protective covering therefor consisting of a sheet of relatively tough, pliable, air impervious, chemically parchmentized vegetable fiber.

2. As a new article of manufacture a laminated structure consisting of alternate layers of rubber and a separable covering of relatively tough, pliable, chemically parchmentized vegetable fiber, the latter adhering more strongly to one face of each layer of rubber than to the face of the second rubber layer with which it is engaged.

3. As a new article of manufacture a laminated structure consisting of alternate layers of rubber and a separable covering of relatively tough, pliable, glycerin-treated, chemically parchmentized vegetable fiber, the latter adhering more strongly to one face of each layer of rubber than to the face of the second rubber layer with which it is engaged.

In witness whereof I affix my signature.

AUGUST M. E. STREIJFFERT.